United States Patent
Strauss et al.

(10) Patent No.: US 8,457,359 B2
(45) Date of Patent: Jun. 4, 2013

(54) METHOD AND ASSISTANCE SYSTEM FOR DETECTING OBJECTS IN THE SURROUNDING AREA OF A VEHICLE

(75) Inventors: Mattias Strauss, Pfungstadt (DE); Matthias Komar, Wangen (DE); Adam Swoboda, Gross-Gerau (DE); Xiuxun Yin, Duisburg (DE)

(73) Assignee: Continental Teves AG & Co. oHG (DE)

( * ) Notice: Subject to any disclaimer, the term of this patent is extended or adjusted under 35 U.S.C. 154(b) by 293 days.

(21) Appl. No.: 12/918,544

(22) PCT Filed: Feb. 17, 2009

(86) PCT No.: PCT/EP2009/051832
§ 371 (c)(1),
(2), (4) Date: Nov. 4, 2010

(87) PCT Pub. No.: WO2009/103692
PCT Pub. Date: Aug. 27, 2009

(65) Prior Publication Data
US 2011/0044507 A1 Feb. 24, 2011

(30) Foreign Application Priority Data
Feb. 20, 2008 (DE) .......................... 10 2008 010 144

(51) Int. Cl.
*G06K 9/00* (2006.01)
(52) U.S. Cl.
USPC .......................................... 382/104; 701/519
(58) Field of Classification Search
None
See application file for complete search history.

(56) References Cited

U.S. PATENT DOCUMENTS

| | | | |
|---|---|---|---|
| 6,300,865 B1 | 10/2001 | Fechner et al. | |
| 7,199,767 B2* | 4/2007 | Spero | 345/7 |
| 7,411,486 B2 | 8/2008 | Gern et al. | |
| 2005/0134440 A1* | 6/2005 | Breed | 340/435 |
| 2005/0228580 A1 | 10/2005 | Winner et al. | |
| 2006/0113119 A1* | 6/2006 | Dudeck et al. | 180/6.2 |
| 2006/0156076 A1* | 7/2006 | Mayer et al. | 714/55 |
| 2007/0083309 A1* | 4/2007 | Danner et al. | 701/41 |

(Continued)

FOREIGN PATENT DOCUMENTS

| | | |
|---|---|---|
| DE | 19720764 A1 | 11/1997 |
| DE | 10 2004057296 A1 | 6/2006 |

(Continued)

OTHER PUBLICATIONS

U.S. Appl. No. 12/672,007, filed Feb. 3, 2010, Luke et al.

(Continued)

*Primary Examiner* — Bhavesh Mehta
*Assistant Examiner* — Tahmina Ansar
(74) *Attorney, Agent, or Firm* — RatnerPrestia (57) ABSTRACT

A method for determining relevant objects in a vehicle moving on a roadway An assistance function is executed in relation to a position of a relevant object, and the relevant objects are determined on the basis of an image evaluation of images of a surrounding area of the vehicle. The images are detected by way of camera sensors. By way of a radar sensor positions of stationary objects in the surrounding area of the vehicle are determined. A profile of a roadway edge is determined using the positions of the stationary objects and that the image evaluation is carried out in relation to the roadway edge profile determined. A driver assistance system suitable for carrying out the method is also described.

15 Claims, 3 Drawing Sheets

U.S. PATENT DOCUMENTS

| | | | |
|---|---|---|---|
| 2007/0188312 A1* | 8/2007 | Bihler et al. | 340/435 |
| 2007/0255480 A1* | 11/2007 | Southall et al. | 701/96 |
| 2010/0310129 A1* | 12/2010 | Hopfner | 382/104 |
| 2011/0044507 A1* | 2/2011 | Strauss et al. | 382/103 |

FOREIGN PATENT DOCUMENTS

| | | |
|---|---|---|
| DE | 10 2005039167 A1 | 2/2007 |
| DE | 10 2006020391 A1 | 6/2007 |
| DE | 10 2007007540 A1 | 8/2008 |
| DE | 10 2007 050568 A1 | 2/2009 |
| EP | 1403660 A1 | 3/2004 |
| EP | 1690730 A1 | 8/2006 |
| EP | 1818231 A2 | 8/2007 |
| EP | 2012211 A1 | 1/2009 |
| JP | 2007-232408 | 9/2007 |
| WO | WO 03/093914 A1 | 11/2003 |

OTHER PUBLICATIONS

Translation of the Office Action for Japanese Patent Application No. 2010-548073 dated Nov. 16, 2012.

* cited by examiner

METHOD AND ASSISTANCE SYSTEM FOR DETECTING OBJECTS IN THE SURROUNDING AREA OF A VEHICLE

CROSS REFERENCE TO RELATED APPLICATIONS

This application is the U.S. national phase application of PCT International Application No. PCT/EP2009/051832, filed Feb. 17, 2009, which claims priority to German Patent Application No. 10 2008 010 144.3, filed Feb. 20, 2008, the content of such application being incorporated by reference herein.

FIELD OF THE INVENTION

The invention relates to the detection of objects in the surrounding area of a vehicle, such as a motor vehicle. The invention further relates to a method for determining relevant objects in a vehicle moving on a roadway, in which in relation to a position of a relevant object an assistance function is executed. Further, the invention relates to a driver assistance system for a vehicle moving on a roadway comprising a camera sensor for detecting camera images of a surrounding area of the vehicle.

BACKGROUND OF THE INVENTION

In modern motor vehicles often assistance systems are provided, which support the driver in driving the motor vehicle. Various systems intend here that objects, which are relevant with regard to the intended assistance function, are detected by means of a camera sensor of the vehicle. Here, the camera images are analyzed by evaluation devices to identify the relevant objects and to determine their relative position in relation to the vehicle. Depending on the distance between the vehicle and a relevant object the execution of predetermined measures is controlled by the assistance functions.

Such a function is a lane-keeping assistant, which supports the driver of the vehicle to keep the vehicle in a lane. For this purpose, on the basis of the camera images lane markings are identified, which limit the lane of the vehicle. If it is determined that the vehicle approaches or crosses a detected lane marking in a predetermined manner, suitable means are carried out to guide the vehicle back into the center of its lane. These measures may comprise a warning of the driver, so that he may correct the driving attitude of the vehicle. Likewise, the performance of automatic steering movements may be provided, to guide the vehicle back into the center of the lane.

Beyond that, assistance systems are known, which recognize threatening collisions of the vehicle with an object in the surrounding area of the vehicle and, if necessary, take action to avoid the collision and/or to reduce collision consequences. Such systems recognize dangerous objects, with which the vehicle could collide, often based on the evaluation of images, which are detected by means of a camera of the vehicle. The distance between the vehicle and these objects may likewise be determined using the camera images and is used to decide whether and at which time action is taken to avoid collision and/or to reduce collision consequences. Such action may comprise for example the automatic execution of driving maneuvers, such as braking or swerving maneuvers. To reduce consequences of a collision for the vehicle passengers, such as passive safety means, such as for example reversible belt tensioners, may be suitably controlled.

The identification of relevant objects in image data, which have been detected with a camera sensor, is usually based on the recognition of typical structure characteristics, which the objects comprise within the image data. This may lead to incorrect recognitions of relevant objects, which may result in a faulty activation of the corresponding assistance function. Thus, for example objects at the roadway edge may comprise similar structures within the image data as another vehicle, with which the own vehicle could collide. Likewise, further objects with similar properties located on the roadway may incorrectly be recognized as lane markings in place of roadway markings or lane markings of another lane are detected.

SUMMARY OF THE INVENTION

It is, therefore, an object of the present invention to reduce malfunctions of an assistance function in a vehicle, which result from the fact that objects in the surrounding area of the vehicle are incorrectly identified as relevant objects on the basis of camera images.

In accordance with a first aspect of the invention a method for determining relevant objects in a vehicle moving on a roadway is proposed, in which in relation to a position of a relevant object an assistance function is executed and in which the relevant objects are determined on the basis of an image evaluation of images of a surrounding area of the vehicle detected by way of a camera sensor. With this method it is provided that positions of stationary objects are determined by way of a radar sensor, that a profile of an edge of the roadway is determined using the positions of the stationary objects and that the image evaluation is carried out in relation to the determined roadway edge profile.

In accordance with a second aspect of the invention a driver assistance system for a vehicle moving on a roadway is proposed. The system comprises a camera sensor for detecting camera images of a surrounding area of the vehicle, a first evaluation unit, which is embodied to determine relevant objects on the basis of the camera images and an assistance device coupled with the first evaluation unit, which is embodied to carry out an assistance function in relation to a position of a relevant object. Furthermore, a radar sensor for detecting objects in the surrounding area of the vehicle is provided and a second evaluation unit coupled with the radar sensor, wherein the second evaluation unit is embodied to determine a profile of a roadway edge using positions of stationary objects detected by way of the radar sensor and wherein the image evaluation in the first evaluation unit may be carried out in relation to the determined roadway edge profile.

The invention thus uses the conclusion that relevant objects take a certain position in relation to the edge of the roadway, on which the vehicle is moving. The profile of the roadway edge is determined here on the basis of stationary objects, which are detected with the aid of a radar sensor. They may be objects, which are arranged at the roadway edge, such as for instance guard rails, guide posts or walls or brick walls arranged at the roadway edge. As the roadway edge profile determined in this way is taken into account in the image evaluation incorrect recognitions of objects, which are relevant for an assistance function, may be avoided or reduced, respectively.

In an embodiment of the method and of the driving assistance system it is provided that a first assistance function comprises the execution of a safety measure, the safety measure being carried out, if a relevant object is detected, with which the vehicle could probably collide. The safety measure may for example be selected from the group comprising an automatic braking operation, an automatic emergency braking, a swerving maneuver, a driver warning and a preconditioning of the vehicle by controlling passive safety means.

A connected embodiment of the method and of the driver assistance system provides that on the basis of the image evaluation an object is determined only then as a relevant object, if it lies outside a range, in which the determined roadway edge is located. This avoids that objects associated to the roadway edge are erroneously identified as relevant objects, with which the vehicle could collide. Furthermore, the image evaluation may be accelerated, since there is no need to analyze the image range, in which the determined roadway edge is located, with regard to the presence of relevant objects, what scales down the image ranges to be analyzed. The image evaluation for determining relevant objects can be restricted to image ranges, which lie outside of a range, in which the determined roadway edge is located.

Additionally or alternatively it may be provided that on the basis of the image evaluation only then an object is determined as a relevant object, if it lies outside a range on a side facing way from the vehicle of the determined roadway edge, as in this range beyond the determined roadway edge usually no relevant objects are to be expected. The image evaluation may also be restricted to image ranges, which lie outside the range of the side facing away from the vehicle of the determined roadway edge.

A further development of the method and of the driver assistance system comprises that a stationary object detected by means of the radar sensor, whose distance to the determined roadway edge exceeds a value, is classified as not belonging to the roadway edge. On the basis of this classification a selection of stationary objects may take place, which are not be assigned to the roadway edge and which insofar might be relevant with regard to a possible collision with the vehicle.

Accordingly, it is provided with a connected embodiment of the method and of the driver assistance system that an object, which has been classified as not belonging to the roadway edge, is determinable on the basis of the image evaluation as a relevant object, in case the object is located on a side facing the vehicle of the roadway edge. By means of this, stationary relevant objects could be identified in reliable manner.

Further, a form of embodiment of the method and of the driver assistance system is characterized by the fact that when determining the roadway edge profile objects are not taken into account, which are classified as not belonging to the roadway edge. By way of this, the accuracy of the determined roadway edge profile is increased.

A further embodiment of the method and of the driver assistance system is characterized by the fact that on the basis of the camera images a lane marking is detected, and that a lane-keeping assistance function takes a measure in relation to a relative position of the vehicle with regard to the detected lane marking and depending on a comparison between the profile of the lane marking and the determined roadway edge profile. The measure may comprise for example a driver warning and/or a correcting steering intervention. It may be carried out if the distance between the vehicle and the roadway marking falls below a threshold value.

Advantageously, with this embodiment measures are taken for returning the vehicle into its lane also depending on the comparison between the profile of the lane marking and the determined roadway edge profile. By way of this, the roadway edge marking recognized on the basis of the image data may be verified by the determined roadway edge profile, whereby false interventions of the lane-keeping assistance function may be avoided or reduced, respectively.

A connected form of embodiment of the method and of the driver assistance system is characterized in that a measure provided due to the relative position of the vehicle in relation to the lane marking is suppressed, if the profile of the lane marking and the determined roadway edge profile deviate from each other in predetermined manner. With this embodiment it is assumed advantageously that the lane marking has been recognized as being incorrect, if its profile deviates in predetermined manner from the determined roadway edge profile. This may be the case, if there is an angle between the roadway marking and the roadway edge, which exceeds a predetermined threshold value. If the roadway marking and the determined roadway edge in turn run essentially parallel to each other, then there is a high security that the roadway marking has been identified as being correct.

A further development of the method and of the driver assistance system provides that the roadway edge profile is determined on the basis of a model-based description, in which parameters of the model are estimated. The model may correspond to a predetermined curve, which is adapted to the determined positions of the objects detected by way of the radar sensor.

In a connected embodiment of the method and of the driver assistance system it is provided that the parameters are selected from the group comprising a lateral distance of the roadway edge to the vehicle, an angle of the vehicle edge towards the vehicle longitudinal direction, a curvature of the roadway edge and a change of the curvature of the roadway edge. On the basis of these parameters a reliable characterization of the roadway edge profile is possible.

A further development of the method and of the driver assistance system is characterized in that the model describes a linear profile of the roadway edge and that the parameters comprise a lateral distance to the vehicle and/or an angle of the roadway edge towards the vehicle longitudinal direction. In most situations such a model allows for a sufficiently reliable description of the roadway edge profile, wherein due to the small number of parameters of the model a fast and/or less computation-intensive estimate of the roadway edge profile is possible. Further, it is avoided that a relative displacement to each other of objects detected by means of the radar sensor, which results from inaccuracies in the detection and/or filtration of the measurement data of the radar sensor or due to an enlarged distance of an object to the actual roadway edge, is erroneously interpreted as roadway curvature.

Beyond that, an embodiment of the method and of the driver assistance system includes that the camera sensor comprises a first detection range and that the radar sensor comprises a second detection range, which overlaps at least partially with the first detection range. The detection ranges may be arranged in vehicle longitudinal direction ahead of the vehicle to be able to detect objects, which the vehicle approaches while driving forward.

Furthermore, a form of embodiment of the method and of the driver assistance system is characterized by the fact that the radar sensor is a component of a system contained in the vehicle for adaptive speed control. Such systems are usually referred to as ACC-systems (ACC: Adaptive Cruise Control). In this form of embodiment the vehicle already has a radar sensor, which within the scope of the invention advantageously leads to an added value.

The aforementioned and further advantages, specialties and expedient further developments of the invention will become apparent also based on the examples of embodiment, which are described hereinafter in conjunction with the drawings.

BRIEF DESCRIPTION OF THE DRAWINGS

The invention is best understood from the following detailed description when read in connection with the accompanying drawings. Included in the drawings are the following figures.

DETAILED DESCRIPTION OF THE PREFERRED EMBODIMENTS

Figure 1:
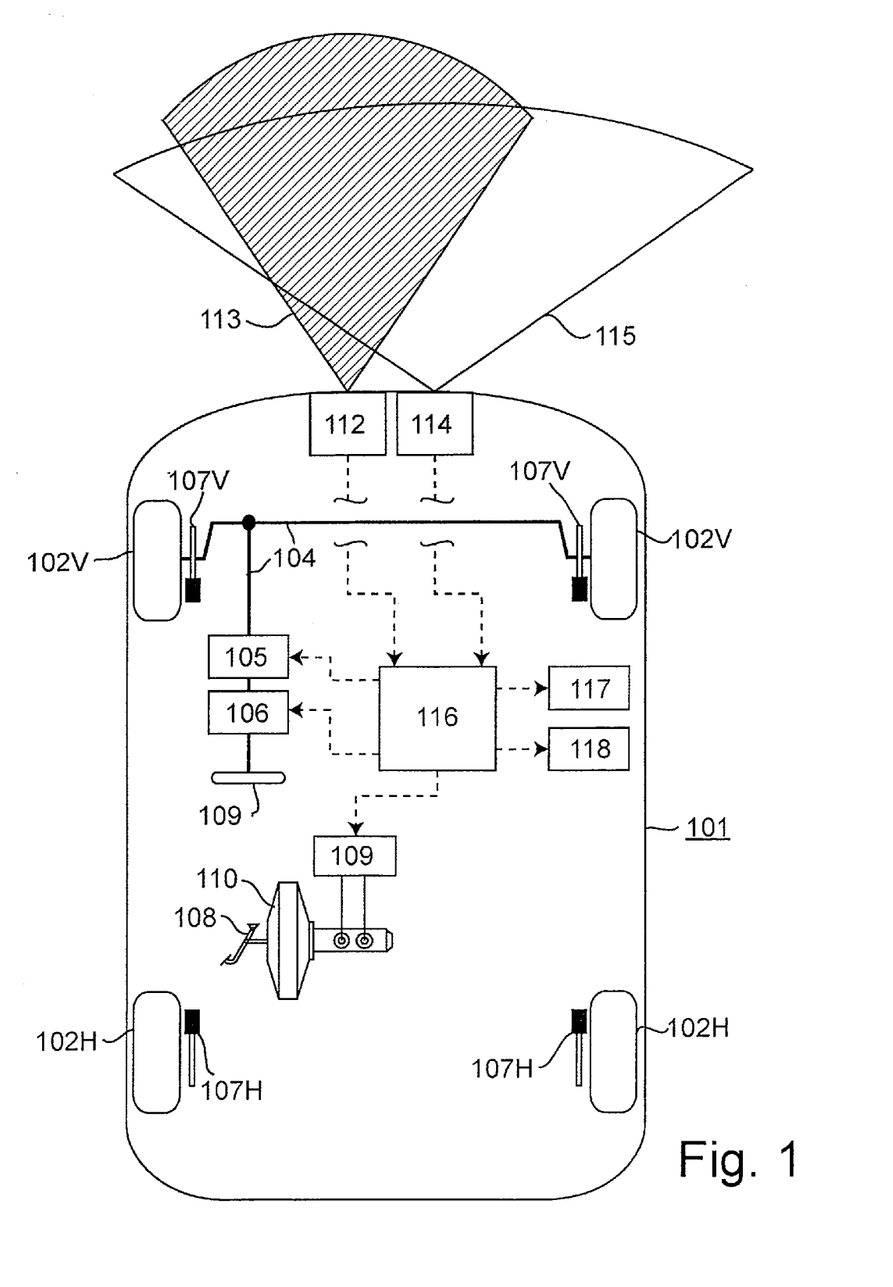
FIG. 1 a schematic representation of a motor vehicle with a system for estimating a roadway edge profile on the basis of objects, which are detected with a radar sensor, FIG. 2 a schematic block diagram of components of an assistance system of the motor vehicle shown in FIG. 1, FIG. 3 a schematic representation of a situation, in which objects are detected at the roadway edge by way of the radar sensor of the motor vehicle.

FIG. 1 shows schematically a motor vehicle 101, which comprises in the exemplary representation two front wheels 102V and two rear wheels 102H. The vehicle 101 is driven by a drive motor not represented in the drawing, which may be for example an internal combustion engine, an electric motor or a hybrid motor. To drive these wheels 102V, 102H, the drive motor produces a torque, which is transmitted to two or four vehicle wheels 102V, 102H via a drive train equally not shown in FIG. 1.

The front wheels 102V of the vehicle 101 are embodied to be steerable, and the wheel steering angle may be adjusted by the driver of the vehicle 101 by means of a steering handle 103, which is connected to the front wheels 102V via a complete steering column system 104. The steering handle 103 is a steering wheel. Optionally, in the steering column system 104 a first steering actuator 105 is included, which makes it possible to actuate the steering column system 104 with a torque, which acts on the steering handle 103. The steering actuator 105 may be implemented for example as a controllable power-assisted steering and makes it possible to convey steering recommendations to the driver of the vehicle 101 by the torque actuation of the steering handle 103. Additionally or alternatively, a second steering actuator 106 may be optionally provided, by means of which the wheel lock angle of the front wheels 102V may be changed in relation to the driver default. By means of the steering actuator 106 automatic steering movements may be performed. In one embodiment the steering actuator 106 comprises an overriding drive designed for example as a planetary gear, with which the steering angle set by the driver by means of the steering handle 103 may be superimposed with a further steering angle. The wheel lock angle of the front wheels 102V results in this case from the sum of the steering angle set by the driver and the additional steering angle.

For decelerating the vehicle 101, a braking system is provided. It comprises wheel brakes 107V, 107H each are each associated to a wheel 102V, 102H. When operating a wheel brake 107V, 107H the associated wheel 102V, 102H is actuated with a brake torque and is thus decelerated. Further, the braking system comprises an actuator 108, which may be operated by the driver of the vehicle 101 and which may be embodied as a brake pedal. With the aid of the actuator 108 a brake torque may be set in the wheel brakes 107V, 107H by the driver, which height results from the extent of the actuation. Beyond that, optionally a brake actuator 109 is provided, by means of which the brake torques generated by the wheel brakes 107V, 107H, may be changed or increased compared with the driver default. Here, the vehicle 101 may be automatically decelerated by means of the brake actuator 109.

In the shown embodiment a hydraulic braking system is concerned. Here, the actuator 108 is connected via a brake booster 110 with a brake master cylinder 111. Via the brake booster 110 a primary pressure may be formed in the brake master cylinder 111 by means of the actuator 108, which may be transmitted via pressure lines not shown in FIG. 1 to the wheel brakes 107V, 107H. Due to the pressurization the wheel brakes 107V, 107H produce a brake torque each, with which the associated wheel is decelerated 102V, 102H. The brake actuator 109 is formed in the shown embodiment as a hydraulic unit, which is connected between the brake master cylinder 111 and the wheel brakes 107V, 107H. The hydraulic unit may be embodied in a form actually known to the person skilled in the art and may comprise an arrangement of valves as well as a pressure source designed as pump, in order to develop a brake pressure in the wheel brakes 107V, 107H and to decelerate the vehicle 101.

Further, the vehicle 101 is equipped with a radar sensor 112, which is arranged in the range of the vehicle front and which comprises a detection range 113 directed forwards in vehicle longitudinal direction. The detection range 113 comprises an opening angle, which is such dimensioned that also in the close-up range objects at the roadway edge and also beyond the roadway edge may be detected with the radar sensor 112. For example, the opening angle is between 45° and 70°. The radar sensor 112 comprises a transmitter, which emits radar radiation into the detection range 113. The radar radiation is partially reflected back to the radar sensor 112 by objects located in the detection range 113. The reflected radiation is detected by means of a receiver contained in the radar sensor 112 and is evaluated by an evaluation unit 201 associated to the radar sensor 112 and represented in FIG. 2. Here, the relative position of the object in relation to the vehicle 101 is detected on the basis of the determined distance between the vehicle 101 and the object as well as on the basis of the angle, under which the object has been detected. In case of extended objects, as for example guide posts or walls, also their width may be determined. Beyond that, while utilizing the Doppler-effect the relative speed of the object in relation to the vehicle 101 is determined, from which the absolute speed of the object may be determined. In one embodiment the properties specified above of detected objects are provided to further systems of the vehicle 101 in form of an object list. The object list here may contain merely properties with regard to objects, which exceed a predetermined size and whose reflected power exceeds a threshold value. In one embodiment only objects are included in the object list, which have a certain size, a probability of existence and duration of existence. For identifying the objects a grouping of detected measuring points is made. The generation of the object list corresponds here to a prefiltration of the measurement data of the radar sensor 112.

Figure 2:
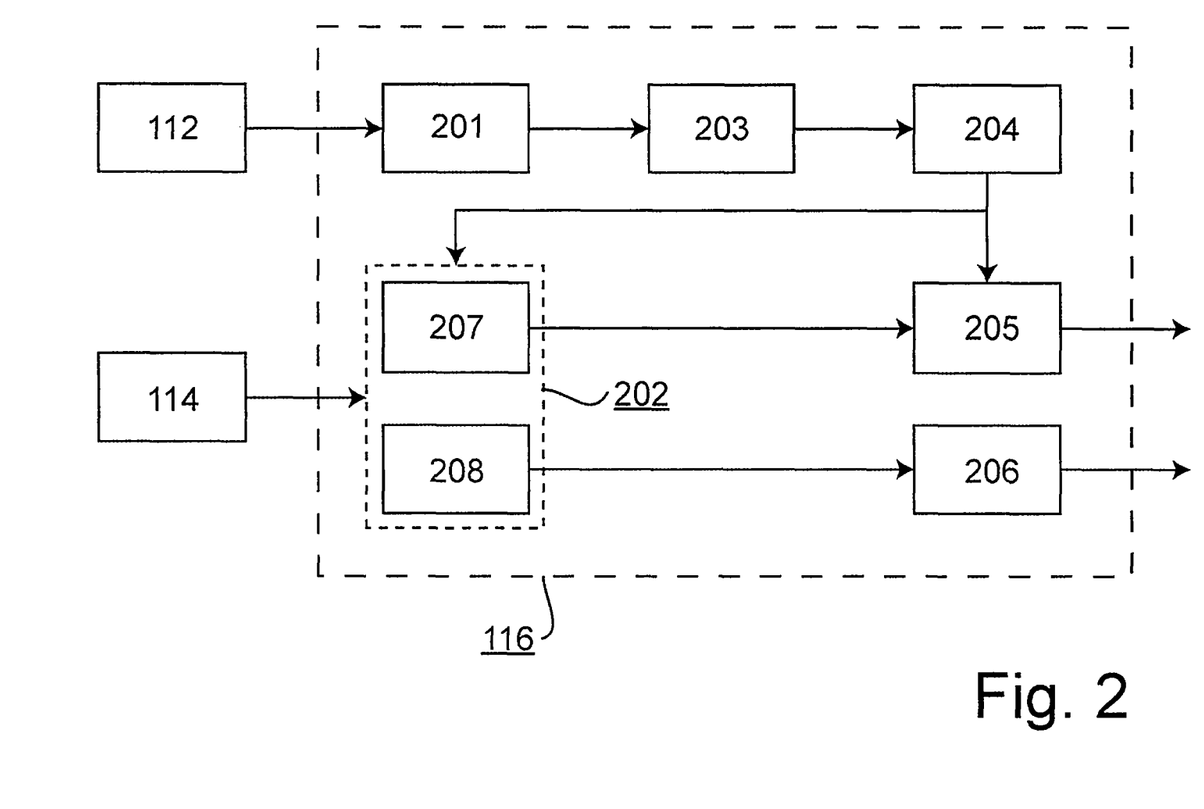

The radar sensor 112 may be a component of an ACC system present in the vehicle 101, which performs an adaptive distance and speed control in a manner known to the person skilled in the art. In this case, the adaptive distance and speed controller is one of the vehicle systems, which use the object list, which is provided by the evaluation unit 201 of the radar sensor 112.

In additional, the vehicle 101 has a camera sensor 114. The latter is embodied for example as a video camera, by means of which images of a camera detection range 115 are recorded. The camera detection range 115 is likewise arranged in vehicle longitudinal direction ahead of the vehicle 101 and overlaps the detection range 113 of the radar sensor 112 at least partially, so that objects within the camera detection range 115 are also detected by way of the radar sensor 112.

Instead of a single centrally arranged camera sensor 114 also several camera sensors may be provided, for example two camera sensors which are arranged laterally at the vehicle 101.

The object list of the radar sensor 112 and the images of the possibly present camera sensor 114 are transmitted to an evaluation and control system 116. Beside the evaluation device 201 for evaluating the radar data, the evaluation and control system 116 comprises also an evaluation device 202 for analyzing the camera images. Furthermore, further components of a driver assistance system are contained, which are further described in the following and which are shown in the schematic block diagram of the system 116 in FIG. 2. They may comprise an estimator 204, in which an estimated roadway edge profile is determined, a lane-keeping assistance device 205, which takes measures by driving other components of the vehicle 101 to prevent the leaving of a lane. Alternatively or additionally to the lane-keeping assistance device 205 a collision avoidance device 206 may be provided, which takes measures by driving components of the vehicle 101 to avoid collisions between the vehicle 101 and surrounding objects and/or to reduce collision consequences. The distance and speed controller of a possibly present ACC system may equally be integrated into the evaluation and control system 116. The components of the evaluation and control system 116 may be realized as software modules, which are performed by means of a microprocessor in an electronic control device of the vehicle 101. It may also be provided that individual components, such as the evaluation units 201, 202 are each a component of the radar sensor 112 and of the camera sensor 114. The estimator 204 may also be integrated into the radar sensor 112. The lane-keeping assistance device 205 and/or the collision avoidance device 206 may be provided in one or several further control devices.

The images recorded by means of the camera sensor 114 are transmitted to the evaluation device 202, which evaluates the image data and identifies and classifies objects and/or structures within the camera images. In one embodiment the evaluation device 202 comprises a block 207, in which present roadway markings are recognized, which limit the lanes of the road used by the vehicle 101. The recognition may made a manner principally known to the person skilled in the art. For the identified roadway markings, moreover their relative position 101 with regard to the vehicle is determined.

Beyond that, in a block 208 further objects of predetermined object categories may be identified within the camera images and their relative position with regard to the vehicle 101 may be determined. These may be objects, which represent a source of danger for the vehicle 101, such as objects with which the vehicle 101 could collide. For example, in this way further vehicles may be recognized by an object recognition within the camera images. The images are evaluated in a way principally known to the person skilled in the art on the basis of predetermined image features by means of one or more classifiers. Examples of suitable classifiers are neuronal networks or support vector machines. A method for recognizing objects of predetermined categories, which may be carried out in block 208 of the evaluation device 202, is described for example in DE 10 2007 050 568 A1, which is incorporated herein by reference. However, other methods may be equally applied.

The object list of the radar sensor 112 is used in the represented driver assistance system to determine the profile of the lane of the vehicle 101 on the basis of the position of objects, which have been detected with the radar sensor 112. The profile of the lane estimated on the basis of the radar data may be used to verify the lane profile determined with the camera sensor 114. Further, the lane profile may be taken into consideration in the image evaluation in block 208 of the evaluation device 202, in which objects are identified within the camera images, which represent a possible source of danger for the vehicle 101.

Figure 3:
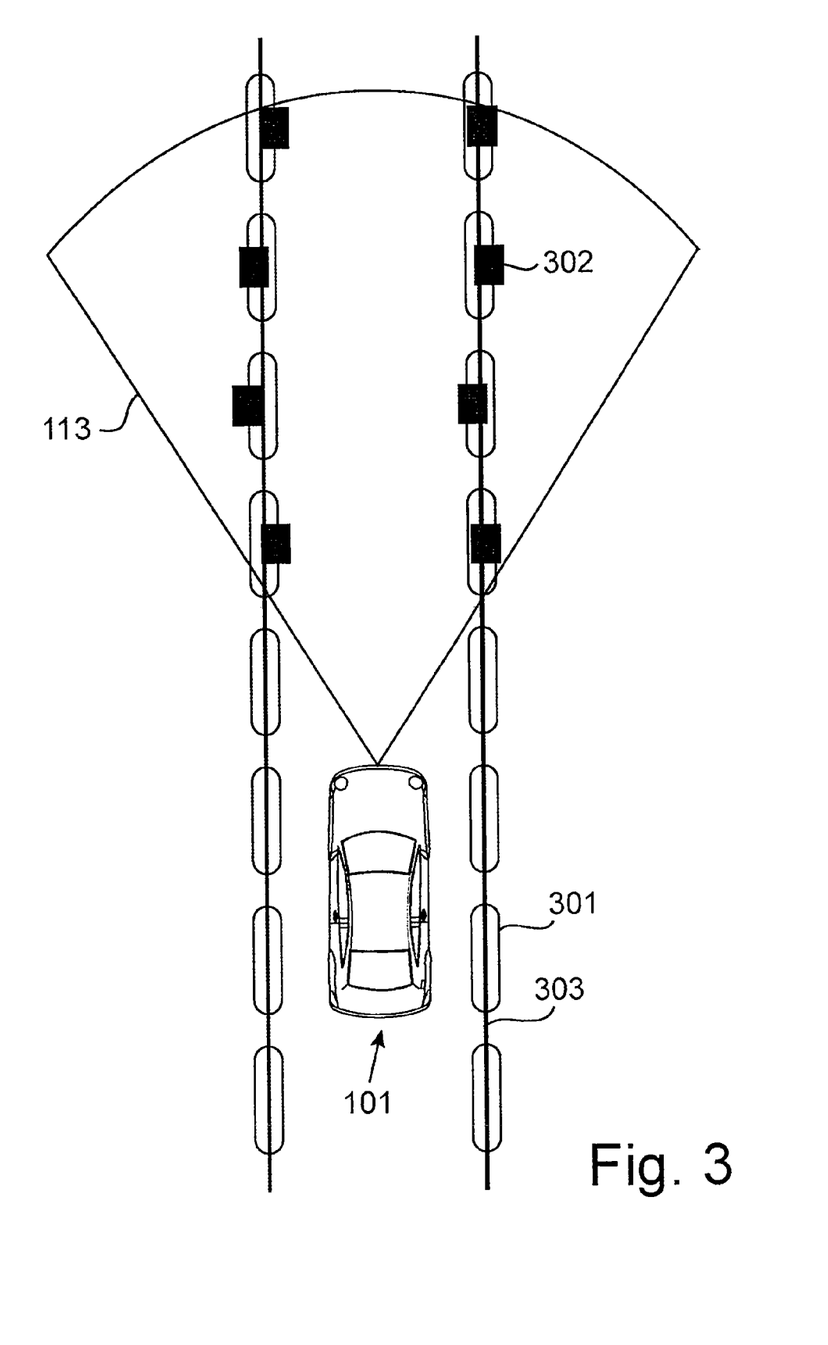

As is shown in FIG. 3, for determining the lane profile stationary objects 301 are used, which are arranged at the edge of the lane on which the vehicle 101 is driving. They may be for example guide posts, walls, such as house walls, distance delimitation posts, as they are used in the range of construction sites, and the like. Such objects 301 are often arranged at a short distance to the roadway and show a certain regularity, so that they may be used for determining the roadway edge profile. In the situation exemplarily shown in FIG. 3 such objects 301 exist on both sides of the roadway, so that the profile of the left and right roadway edge may be estimated. Often, however, suitable objects are only present on one side of the lane.

For determining the roadway profile on the basis of objects 301 detected by way of the radar sensor 112, the object list, which is produced by the evaluation device 201 associated to the radar sensor 112, is first supplied to a selection device 203. The latter selects the stationary objects from the objects, listed in the object list, i.e. those objects, whose absolute speed amounts to zero and whose relative speed with regard to the vehicle 101 corresponds to the absolute speed component of the vehicle 101 along to the connecting direction between the vehicle 101 and the concerned object. Moving objects, i.e. objects with an absolute speed different to zero, are discarded by the selection device 203.

The object data of the stationary objects contained in the object list is transmitted from the selection device 203 to an estimator 204, which on the basis of the positions of the stationary objects 301 determines the profile of the roadway edge. In order to clarify the proceedings, in addition to the objects 301 the position 302 of the objects 301, reported in each case by the radar sensor 112, is represented in FIG. 3, which position 302 due to measurement inaccuracies may deviate from the actual position of the objects 301. Beyond that, FIG. 3 shows the roadway edge profile 303 estimated by means of the estimator 204.

The determination of the roadway edge profile in the estimator 204 begins, if a predetermined number of reported stationary objects 301 is in a corridor with a predetermined form. To recognize such a situation, the relative position of the stationary objects 301 to each other is monitored by the estimator 204. The corridor may be straight and has a predetermined width. In one embodiment it is aligned in addition parallel to the vehicle longitudinal axis to facilitate the identification of objects 301 at the roadway edge.

If the estimator 204 states that the entrance condition for the estimation method is fulfilled, i.e. if the predetermined number of objects has been recognized within the predetermined corridor, then the approximated roadway edge profile 303 is estimated on the basis of the stationary objects 301 detected by the radar sensor 112. This happens while using a mathematical model of the roadway edge, which is adapted to the detected positions 302 of the objects 301. The proceedings corresponds to the determination of a regression curve concerning the determined positions 302 of the objects 301.

In one embodiment the approximated roadway edge 303 is a straight line. In a stationary coordinate system, which is initialized in a measurement point in such a manner that the origin lies within the vehicle 101, for example in the vehicle center, that the x-axis points forward in vehicle longitudinal direction and that the y-axis is aligned rectangular to the vehicle longitudinal axis and points to the left relating to the vehicle longitudinal direction, here the roadway edge 303 has the form y=d+a·x. Here, d refers to the lateral distance of the roadway edge 303 to the center of gravity of the vehicle 101 in the measurement point, and for the slope a of the straight line tan γ=a applies, whereby γ is the angle between the roadway edge 303 and the vehicle longitudinal axis. Alternatively, also a curve of higher order, for example a curve of second or third order may be selected as a model of the roadway edge 303. Beside the parameters of the straight line such a curve has a curvature and—in case of the curve of third order—a change of the curvature. When using a straight line, however, it may be avoided that a relative displacement to each other of objects 301 detected by way of the radar sensor 117, which may result from an inaccurate, prefiltration of the radar measuring data containing the grouping of measurement points, is falsely interpreted as roadway curvature. With a more exact prefiltration, however, also curves of second or third order may be used as a model of the roadway edge.

The adaptation of the model to the determined positions 302 of the stationary objects 301 is made by an adaptation of the model parameters. The calculation of the approximated roadway edge 303 is carried out as long as a sufficient quantity of stationary objects 301 is detected by the radar sensor 112. For successive detecting steps the calculation is adapted in each case to changed object lists. Objects 301 added here are also included into the evaluation, and an adaptation is made to the changed position of the vehicle 101 with regard to the objects already detected in preceding steps on the basis of a corresponding tracking of the roadway edge 303.

Beyond that, when estimating the roadway edge profile objects 301 are not taken into consideration, whose distance from the approximated roadway edge 303 exceed a predetermined value. These objects are not considered to belong to the roadway edge 303. Above all, added objects 303 are not taken into consideration in the determination of the roadway edge, whose distance from the already calculated roadway edge 303 exceed a predetermined threshold.

The profile of the roadway edge 303 determined in the estimator 204 is transmitted in one embodiment to a lane-keeping assistance device 205. The relative position of the vehicle 101 in relation to present lane markings is likewise transmitted to the lane-keeping assistance device 205, which position is determined in the above-described manner in block 207 of the evaluation device 202.

The lane-keeping assistance device 205 evaluates the position of the vehicle 101 relative to recognized edges of the lane to determine a threatening leaving of the lane. The threatening leaving of the lane is recognized here, if the distance between the vehicle 101 and a recognized edge of the lane falls below a threshold value. If the lane-keeping assistance device 205 states a threatening leaving of the lane, then in one embodiment a warning is given controlled by the lane-keeping assistance device 205. This is performed by means of a warning device, which is schematically provided with the reference numeral 117 in FIG. 1. This may be an optical warning, of which the driver of the vehicle 101 is notified, an acoustic warning, which is given by means of a speaker arranged in the interior of the vehicle 101, or a haptic warning, which is communicated for example by a vibration of a driver's seat of the vehicle 101. Likewise a haptic warning may be communicated as a vibration of the steering handle 103 generated by the steering actuator 105. A combination of several warnings may also be provided. Due to the given warnings the driver may correct the driving behavior of the vehicle 101 and may thus lead the vehicle 101 back into its lane or may avoid a leaving of the lane, respectively.

In a further embodiment the lane-keeping assistance device 205 controls the steering actuator 105 if necessary in such a manner that the steering handle 103 is actuated with a steering torque, which effects a steering movement, which leads the vehicle 101 towards the center of its lane. On the basis of this steering torque the driver of the vehicle 101 is made aware on the one hand of the fact that the vehicle 101 leaves its lane. On the other hand, on the basis of the steering torque the driver is prompted to correct the steering movement which leads the vehicle 101 back into its lane or into the center of its lane, respectively. The actuation of the steering handle 103 with a corrective steering torque may be carried out additionally or alternatively to the warning of the driver. As an alternative to the actuation of the steering handle 103 with the steering torque it may also be provided that the lane-keeping assistance device 205 carries out automatic steering movements by means of the steering actuator 106, which lead the vehicle 101 back into its lane or keep it in the center of its lane, respectively.

Furthermore, also a lane-following control may be carried out by means of the lane-keeping assistance device 205. Here, the vehicle 101 is guided along its lane with the aid of control interventions, which are controlled by a lane-following controller contained in the lane-keeping assistance device 205, by keeping the distance between the vehicle 101 and the determined roadway edge substantially constant. The control interventions may be automatic steering movements, which are carried out by means of the steering actuator 106. Alternatively, the complete steering column system 104 with the steering actuator 105 may be actuated with a steering torque, which leads to steering movements, which keep the vehicle 101 at a constant distance to the detected lane marking.

The lane markings detected by way of the camera sensor 114 may be used by the lane-keeping assistance device 205 as roadway edges, provided they are present. If exclusively such lane markings are detected and an estimate of the roadway edge profile is not possible on the basis of radar objects 301, then the lane markings are used by the lane-keeping assistance device 205 as roadway edges. If there are no lane markings or for other reasons cannot be detected with the camera sensor 114, however, the roadway edge profile 303 may be estimated on the basis of radar objects 301 by means of the estimator 204, then the estimated roadway edge profile 303 is used as a roadway edge.

If lane markings are recognized with the camera sensor 114 and in addition a roadway edge 303 may be estimated by means of the estimator 204 on the basis of the radar data, then in one embodiment the roadway edge 204 determined in the estimator 204 is used to verify the profile of the recognized lane markings. For this purpose, it may be tested whether the recognized lane markings and the estimated roadway edge 303 in predetermined boundaries run parallel to each other or, respectively whether deviations of the parallelism do not exceed predetermined thresholds. A deviation from the parallelism of the recognized lane marking and of the estimated roadway edge 303 is stated in one embodiment, if an angle between the lane marking and the estimated roadway edge exceeds a predetermined threshold. If no deviation from the expected parallelism is determined, then the recognized lane marking is used as a roadway edge. Otherwise the lane-keeping assistance function is deactivated. By such a validation of the recognized lane marking it may be avoided, for example, that the lane-keeping assistance function is based on lane markings, the profile of which were incorrectly determined or which are associated to another than the lane of the vehicle 101. The validation may also be made if the lane markings are detected on one side of the vehicle 101 and the estimated roadway edge profile is determined for the other vehicle side 303.

In one embodiment as an alternative to the provision of the estimated lane profile 303 for the lane-keeping assistance device 205 or in addition hereto a cross-linking of the estimator 204 and the block 208 of the evaluation device 202 is provided, in which on the basis of the camera images detected by way of the camera sensor 114 dangerous objects are identified, with which the vehicle 101 could collide.

The results of the evaluation made in block 208 are used in a collision avoidance device 206. The latter is provided to control measures, which avoid a collision of the vehicle 101 with an object or which decrease collision consequences. The measures may be initiated by the collision avoidance device 206, if there is a certain probability for a collision between the vehicle 101 and a detected object.

For determining this probability, in one embodiment a collision time is calculated, which corresponds to the period up to a collision with the object. It is calculated from the relative position of the object in relation to the vehicle 101 and the relative speed between the vehicle 101 and the concerned object. The relative position of the object in relation to the vehicle 101 is determined in one embodiment on the basis of a distance measurement carried out by way of the radar sensor 12. If the camera sensor 114 comprises a stereo camera, the stereo images may likewise be used for the distance determination. If the collision time falls below a certain threshold value, a safety measure is initiated by the collision avoidance device 206. If step-by-step safety measures are provided, then different threshold values may be provided to initiate measures of different escalation stages.

It may be provided that the collision avoidance device 206 controls an automatic braking maneuver to avoid a collision, i.e. it is embodied as an emergency brake assistant. The braking maneuver may be carried out by means of the brake actuator 109. Further, it may be provided that the collision avoidance device 206 initiates an automatic swerving maneuver, which is carried out by means of the steering actuator 106. Additionally or alternatively in case of a threatening collision also optical, acoustic or haptic warnings may be given, which make the driver aware of a possible and/or threatening collision, so that the driver may implement suitable measures to avoid a collision. Further, in case of a threatening collision with an object it may be provided to prepare the vehicle 101 by triggering corresponding safety means, such as for example recursive belt tensioners, to decrease collision consequences for the vehicle passengers. Such safety means are shown on the basis of block 118 schematically in FIG. 1.

The measures specified above may be carried out in steps, wherein in different escalation stages various interventions are provided. Here, warnings are associated for example to a smaller and/or weaker step and interventions into the driving behavior of the vehicle 101 are associated to a higher and/or stronger step. Further, the measures may be carried out on the one hand in an emergency situation. On the other hand, for example the execution of an automatic braking operation and/or the release of a warning or of a hint, respectively, to a stationary object located in the lane may also be provided within a comfort function, such as within a so-called full-speed-ACC-system, i.e. an ACC-system, which works in the entire speed range and which decelerates the vehicle 101 until standing, if necessary.

The recognition and identification of relevant objects in the lane of the vehicle 101, with which the vehicle 101 could collide, is made on the basis of the images in block 208 of the evaluation device 202, detected by way of the camera sensor 114. It is, however, provided to use the above-described classification of stationary objects detected with the radar sensor 112 to improve and/or accelerate the recognition.

In one embodiment the estimator 204 transmits for this purpose the estimated roadway edge profile to the evaluation device 202, such as to the block 208. Alternatively or additionally, the estimator 204 may report the positions 302 of the individual objects 301, which were associated to the estimated roadway edge 303 and which are used to estimate the roadway edge profile.

In one embodiment on the basis of the estimated roadway edge profile 303 reported by the estimator the ranges of the camera images are determined, which are to be assigned to the estimated roadway edge profile 303. Here, a predetermined width of the roadway edge 303 may be used to determine an extended image range, in which the estimated roadway edge 303 is located. With this the structures within the camera image may be identified, which are to be assigned to the roadway edge. If the positions 301 of the individual objects 301 associated to the roadway edge are reported from the estimator 204 to the evaluation unit 202, the positions of the individual objects 301 may be taken into account to identify structures belonging to the roadway edge 303.

Structures, which have been associated to the roadway edge 202, are not determined in the evaluation unit 202 as relevant objects, with which the vehicle 101 could collide. If on the basis of the image evaluation of the camera images an object is identified, which has been associated by the estimator 204 to the roadway edge 303 and/or is arranged in the range of the determined roadway edge 303, this object is not determined as relevant with regard to a collision. In one embodiment it is provided that the camera image within the determined structures and/or image ranges associated to the roadway edge is not evaluated as to whether relevant objects are contained, with which the vehicle could collide.

Since the driver usually follows the roadway profile, those objects associated to the roadway edge are not relevant with regard to a possible collision. By neglecting the roadway edge ranges in the image evaluation in block 208 of the evaluation device 202 it is accelerated, as certain image ranges do not need to be analyzed in detail. Further, the incorrect recognition of relevant objects at the roadway edge is avoided, so that false initiations of the safety measures controlled by the collision avoidance device 206 may be reduced.

Beyond that, it may also be provided that in the block 208 of the evaluation device 202 image ranges are determined, which refer to a side facing away from the vehicle 101 of the roadway edge 303, i.e. depict those ranges, which lie beyond the roadway edge 101 when viewed from the vehicle 101. These image ranges correspond to the ranges beyond the roadway on which the vehicle 101 is moving. Usually, in this range also no dangerous objects are contained, with which the vehicle could collide. It must be rather assumed that objects from this range do not move so easily on the lane of the vehicle 201. Therefore, for the image ranges, which are associated to a side facing away form the vehicle 101 of the roadway edge, in one embodiment there is also made no evaluation as to whether relevant objects are contained, with which the vehicle 101 could collide.

In a further form of embodiment it is provided that alternatively or additionally the estimator reports those positions of objects to the block 208, which are not associated to the estimated roadway edge 303 and which are located on the same side of the estimated roadway edge 303 as the vehicle 101. These are stationary objects, which are on the roadway of the vehicle 101. On the basis of the position of these objects then the ranges of the camera image are determined in the block 201, which correspond to the positions. With regard to the concerned objects the evaluation device 202 makes a comparison with those objects, which have been determined on the basis of the image evaluation. If an object is determined both on the basis of the image evaluation and is also reported by the estimator 204, then the object is determined to be relevant with regard to a collision of the vehicle 101. Moreover, it may be provided that an object is discarded, which has been recognized neither on the basis of the radar data nor on the basis of the camera images.

Further, it may be provided that the concerned ranges in the image analysis are evaluated with priority to determine relevant stationary objects, with which the vehicle 101 could collide. By a such prioritized evaluation of potential relevant image ranges the recognition of relevant objects, which have been recognized by the estimator 204, may be accelerated. Here, it may be determined on the basis of the image analysis whether in fact relevant objects are concerned, with which the vehicle could collide.

Although the invention was described in detail in the drawings and in the preceding description, the descriptions are to be understood illustratively and/or exemplarily but not restrictively; the invention is not restricted to the explained examples of embodiment. Further variants of the invention and its embodiments will become apparent for the person skilled in the art from the preceding disclosure, the drawings and the patent claims.

Terms such as "comprise", "show", "contain", "include" and the like used in the patent claims do not exclude further elements or steps. The use of the indefinite article does not exclude a plurality. An individual device may carry out the functions of several units and/or devices specified in the patent claims.

Reference numerals indicated in the patent claims shall not be regarded as restrictions of the used means and steps.

The invention claimed is:

1. A method for determining relevant objects for a vehicle moving on a roadway, comprising:
    carrying out an assistance function in relation to a position of a relevant object,
    determining the relevant objects on the basis of an image evaluation of images of a surrounding area of the vehicle, said images being detected by way of camera sensors,
    determining positions of stationary objects located in the surrounding area of the vehicle and outside of an edge of the roadway by way of a radar sensor,
    determining a profile of the roadway edge using the positions of the stationary objects, and
    carrying out the image evaluation in relation to the determined roadway edge profile.

2. The method according to claim 1, wherein carrying out a first assistance function further comprises executing a safety measure, wherein the safety measure is executed, if a relevant object has been detected, with which the vehicle could probably collide.

3. The method according to claim 2, wherein on the basis of the image evaluation an object is determined as a relevant object only in case it lies outside of a range, in which the determined roadway edge is located.

4. The method according to claim 2, wherein on the basis of the image evaluation an object is determined as a relevant object only in case it lies outside of a range on a side facing away from the vehicle of the determined roadway edge.

5. The method according to claim 1, wherein a stationary object detected by way of the radar sensor, whose distance to the determined roadway edge exceeds a value, is classified as not belonging to the roadway edge.

6. The method according to claim 5, wherein an object, which is classified as not belonging to the roadway edge, can be determined on the basis of the image evaluation as a relevant object, in case the object lies on a side facing the vehicle of the roadway edge.

7. The method according to claim 5, wherein in the determination of the roadway edge profile objects are not taken into consideration, which are classified as not belonging to the roadway edge.

8. The method according to claim 1, wherein on the basis of the camera images a lane marking is detected, and wherein a lane-keeping assistance function initiates a measure depending on a relative position of the vehicle with regard to the detected lane marking and depending on a comparison between the profile of the lane marking and the determined roadway edge profile.

9. The method according to claim 8, wherein a measure provided due to the relative position of the vehicle with regard to the lane marking is suppressed, if the profile of the lane marking and the determined roadway edge profile deviate from each other in predetermined manner.

10. The method according to claim 1, wherein the roadway edge profile is determined on the basis of a model-based description, by estimating parameters of the model.

11. The method according to claim 10, wherein the parameters are selected from the group comprising: a lateral distance of the roadway edge to the vehicle, an angle of the roadway edge to the vehicle longitudinal direction, a curvature of the roadway edge and a change of the curvature of the roadway edge.

12. The method according to claim 10, wherein the model describes a linear profile of the roadway edge and the parameters comprise a lateral distance of the vehicle and/or an angle of the roadway edge towards the vehicle longitudinal direction.

13. The method according to claim 1, wherein the camera sensor comprises a first detection range and the radar sensor a second detection range, which at least partially overlaps with the first detection range.

14. The method according to claim 1, wherein the radar sensor is a component of a system for adaptive speed control contained in the vehicle.

15. A driver assistance system for a vehicle moving on a roadway comprising:
    a camera sensor for detecting camera images of a surrounding area of the vehicle,
    an evaluation unit configured to determine relevant objects on the basis of the camera images,
    an assistance device coupled with the evaluation unit and configured to execute an assistance function depending on a position of a relevant object,
    a radar sensor for detecting objects located in the surrounding area of the vehicle and outside of an edge of the roadway, and
    an estimator configured to determine a profile of the roadway edge on the basis of positions of the objects detected by the radar sensor and wherein the image evaluation in the evaluation unit is feasible depending on the determined roadway edge profile.

* * * * *

UNITED STATES PATENT AND TRADEMARK OFFICE
CERTIFICATE OF CORRECTION

PATENT NO. : 8,457,359 B2  
APPLICATION NO. : 12/918544  
DATED : June 4, 2013  
INVENTOR(S) : Strauss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 332 days.

Signed and Sealed this
Eighth Day of September, 2015

Michelle K. Lee
*Director of the United States Patent and Trademark Office*